United States Patent
Deev et al.

(10) Patent No.: US 12,523,524 B2
(45) Date of Patent: Jan. 13, 2026

(54) SYSTEMS FOR REAL-TIME LASER POWER MONITORING

(71) Applicant: Alcon Inc., Fribourg (CH)

(72) Inventors: Andrei Deev, Pasadena, CA (US);
Adela Apostol, Laguna Hills, CA (US);
Mikhail Ovchinnikov, Dana Point, CA (US)

(73) Assignee: Alcon Inc., Fribourg (CH)

( * ) Notice: Subject to any disclaimer, the term of this patent is extended or adjusted under 35 U.S.C. 154(b) by 204 days.

(21) Appl. No.: 18/422,557

(22) Filed: Jan. 25, 2024

(65) Prior Publication Data

US 2024/0255346 A1     Aug. 1, 2024

Related U.S. Application Data

(60) Provisional application No. 63/481,644, filed on Jan. 26, 2023.

(51) Int. Cl.

| | |
|---|---|
| *G01J 1/42* | (2006.01) |
| *A61B 18/20* | (2006.01) |
| *A61B 18/22* | (2006.01) |
| *A61B 17/00* | (2006.01) |
| *A61B 18/00* | (2006.01) |
| *A61F 9/008* | (2006.01) |

(52) U.S. Cl.
CPC ............ *G01J 1/4257* (2013.01); *A61B 18/20* (2013.01); *A61B 18/22* (2013.01); *A61B 2017/00725* (2013.01); *A61B 2018/00779* (2013.01); *A61B 2018/00785* (2013.01); *A61F 9/008* (2013.01)

(58) Field of Classification Search
CPC ............... A61B 18/20; A61B 18/22; A61B 2017/00725; A61B 2018/00779; A61B 2018/00785; A61F 9/008; G01J 1/4257
See application file for complete search history.

(56) References Cited

U.S. PATENT DOCUMENTS

| | | |
|---|---|---|
| 6,538,739 B1 | 3/2003 | Visuri |
| 8,262,647 B2 | 9/2012 | Raksi |
| 8,506,559 B2 | 8/2013 | Raksi |
| 9,521,949 B2 | 12/2016 | Bor |
| 10,314,746 B2 | 6/2019 | Angeley |
| 2005/0021013 A1 | 1/2005 | Visuri |

(Continued)

OTHER PUBLICATIONS

Yohei, Takata, et al. "Positioning of catheter with optical fiber using dynamics of laser-induced bubbles near thrombus", SPIE website accessed Jan. 25, 2023.

*Primary Examiner* — Mark R Gaworecki

(57) ABSTRACT

The present disclosure generally relates to systems and methods for laser power measurement, and more particularly, systems and methods for laser power measurement in a sterile operating environment. In certain embodiments described herein, power measurement is performed utilizing two laser sources: 1) a first laser source configured to generate a first laser beam (treatment laser); and 2) a second laser source configured to generate a second laser beam (test laser). The first laser beam generates a bubble in a test material (e.g., water, saline, balanced salt solution, gel, etc.) and the second laser beam is reflected back with the reflected portion of the second laser beam being measured to determine a lifetime of the bubble and correlate the lifetime measurement with a power measurement based on a correlation curve.

15 Claims, 7 Drawing Sheets

(56) References Cited

U.S. PATENT DOCUMENTS

2006/0052661 A1    3/2006  Gannot
2022/0354692 A1   11/2022  Bor
2022/0409275 A1*  12/2022  Hoang ............... A61B 5/14542
2023/0414413 A1   12/2023  Smith

* cited by examiner

SYSTEMS FOR REAL-TIME LASER POWER MONITORING

BACKGROUND

To prepare a surgical laser system for surgery, components of the surgical laser system (e.g., a surgical console with a laser source, handpiece, consumable, optical fiber) must all be assembled together. Proper assembly allows for efficient transmission of a laser light from the laser source all the way to the distal optical fiber tip. An incomplete and/or incorrect assembly or misalignment of components during use can lead to a lack of sufficient radiation at the optical fiber tip and, thus, a lack of efficiency. Moreover, while the power at the source of the laser may be known, the power level at the optical fiber tip may be unknown due to inherent variability in the optical connection of the different components of the surgical laser system during assembly or through use.

Conventional systems require the use of a power meter coupled to the surgical laser system to measure power levels of transmitted laser light. Typically, the power level of the laser light transmitted by the surgical laser system is measured prior to a surgical procedure. However, because the power meter is a non-sterile piece of equipment, the use of the power meter in an operating room environment is cumbersome and time consuming as the non-sterile power meter must be carefully handled and isolated to maintain sterility for patient safety. Furthermore, because conventional testing systems are non-sterile, use to verify laser power delivery during surgery is not possible.

SUMMARY

The present disclosure relates to systems and methods for laser power measurement in a sterile operating environment.

In certain embodiments, laser power measurement is performed by a system comprising first and second laser sources, an optical fiber, and an optical detector. The first and second laser sources generate first and second laser beams, respectively. The optical fiber is configured to receive and direct the first and second laser beams to a test material. The first laser beam forms a bubble in the test material. A portion of the second laser beam is reflected back into the optical fiber from an interface of the optical fiber and the test material. The optical detector receives the reflected portion and determines a power level of the first laser beam based on the reflected portion of the second laser beam. The system allows for a power level determination in a sterile manner.

In certain embodiments, a method is provided. The method includes generating, by a first laser source, a first laser beam. The method also includes generating, by a second laser source, a second laser beam. The method also includes receiving, by an optical fiber, the first laser beam from the first laser source. The method also includes directing, by the optical fiber, the first laser beam to a test material to form a bubble in the test material. The method also includes receiving, at the optical fiber, the second laser beam from the second laser source. The method also includes directing, by the optical fiber, the second laser beam to the test material. The method also includes receiving, at the optical fiber, a reflected portion of the second laser beam from the distal end of the fiber and the bubble. The method also includes directing, by the optical fiber, the reflected portion of the second laser beam to an optical detector. The method also includes receiving, at the optical detector, the reflected portion of the second laser beam from the optical fiber. The method also includes determining, by the optical detector, a power level of the first laser beam based on a duration of a change in the reflected portion of the second laser beam received at the optical detector.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1A:
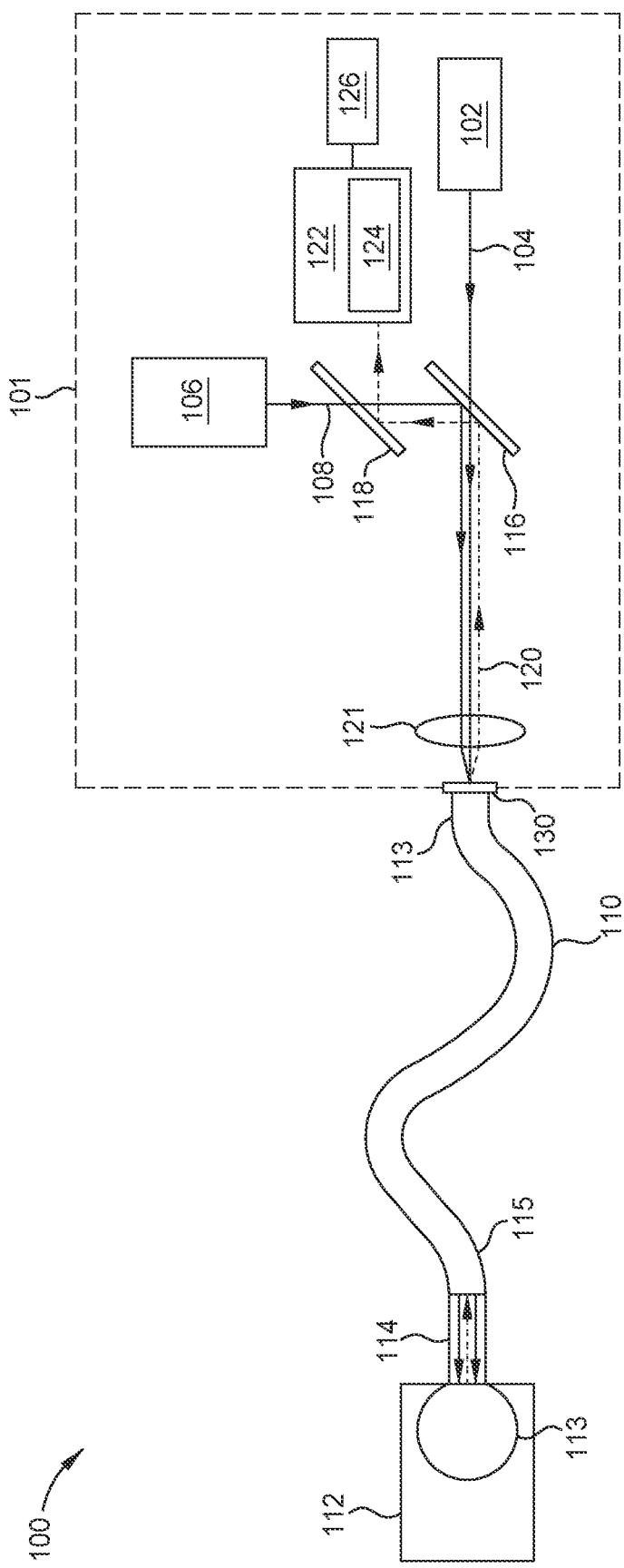
FIG. 1A illustrates an example system for performing laser power measurement, in accordance with certain embodiments of the present disclosure.

The present disclosure generally relates to systems and methods for laser power measurement, and more particularly, to systems and methods for laser power measurement in operating environments (e.g., sterile surgical operating environments).

Conventional systems require the use of a power meter to measure the power of laser beams delivered from the working tip of an optical fiber. However, because power meters are typically non-sterile pieces of equipment, the use of a power meter in an operating room environment is cumbersome and time consuming when trying to maintain sterility for patient safety. Further, due to the non-sterile nature of power meters, the power levels of laser beams transmitted by a surgical laser system are typically only measured prior to performance of a surgical procedure. Yet, it is important to monitor the power of laser beams delivered from the working tip of an optical fiber throughout the performance of a surgical procedure. Accordingly, embodiments of the present disclosure provide systems and methods that enable efficient laser power measurement before, during, and after performance of a surgical procedure in a sterile operating environment.

In certain embodiments described herein, power measurement of a surgical laser system is performed utilizing two laser sources: 1) a first laser source configured to generate a first laser beam (a "treatment" laser beam, such as an infrared (IR) laser beam); and 2) a second laser source configured to generate a second laser beam (a "test" laser beam, such as a visible light laser beam). Prior to or during a surgical procedure, the first laser beam and second laser beam may be propagated into a test material (e.g., water, saline, balanced salt solution, gel, etc.) to measure or monitor power levels of the first laser beam generated by the first laser source. The first laser beam, when propagated into the test material, generates a transient vapor bubble in the test material, which may alter the portion of the second laser beam reflected back into the surgical laser system. The duration of the change in the reflected portion of the second laser beam may then be optically measured to determine a lifetime of the vapor bubble, which can be correlated with laser power values based on one or more correlation curves.

Laser power measurement using the back-reflection of the second laser beam allows for efficient testing in a sterile environment and even during a surgical procedure, without necessitating the utilization of non-sterile equipment such as a power meter. Testing of laser power levels facilitates identification of equipment issues including improper assembly, faulty components, misalignment due to movement or use prior to or during a surgical operation, and the like. Thus, the methods and systems described herein enable not only real-time testing during surgical procedures, but also improve overall safety of the surgical procedures by decreasing the risk of introducing contaminants.

FIG. 1A illustrates a system 100 for performing laser power measurement, in accordance with certain embodiments of the present disclosure. The system 100 includes a surgical laser system 101, which may be operably coupled to and/or in communication with a surgical console, such as a surgical console for ophthalmic surgical procedures. The surgical laser system 101 comprises a first laser source 102 configured to generate a first laser beam 104, and in certain embodiments, a second laser source 106 configured to generate a second laser beam 108. Generally, the system 100 enables measurement of the power of the first laser beam 104 as generated by the first laser source 102 of the surgical laser system 101 in real time.

In some embodiments, the first laser source 102 is a treatment laser source configured to generate the first laser beam 104 for treatment of a patient. The first laser beam 104 may be used for cutting and/or emulsifying material during a surgical operation. For example, the first laser beam 104 may be used as a treatment beam for performing various functions during ophthalmic surgical procedures (e.g., vitreoretinal procedures, glaucoma surgeries, cataract surgeries, etc.).

In some embodiments, the first laser beam 104 generated by the first laser source 102 is an ultraviolet ("UV") (<350 nm) (nanometers) laser light. In some embodiments, the first laser beam 104 is an infrared ("IR") (780-4000 nm) laser light, such as a mid-IR laser light. In some embodiments, the first laser beam 104 is an argon blue-green laser light (488 nm), a Nd—YAG (neodymium-doped yttrium aluminum garnet) laser light (532 nm) such as a frequency-doubled Nd—YAG laser light, a krypton red laser light (647 nm), or any other suitable type of laser light for ophthalmic surgery.

In some embodiments, the first laser beam 104 has a wavelength of about 500 nm.

In some embodiments, the first laser source 102 may generate and propagate the first laser beam 104 having a pulse rate within a range of about 100 hertz (Hz) and 10 kilohertz (kHz). In some embodiments, the first laser source 102 may generate and propagate the first laser beam 104 having a pulse rate within a range of about 10 kilohertz (kHz) and about 500 kHz, or between about 1 kHz and about 1500 Hz. Other pulse rate ranges are contemplated as well. In some examples, the first laser source 102 produces a nanosecond, a picosecond, or a femtosecond first laser beam 104. In some embodiments, the first laser source 102 is a continuous wave (CW) laser source that can be switched to a pulsed mode during a calibration procedure.

Returning now to FIG. 1A, in certain embodiments, the surgical laser system 101 also includes the second laser source 106 configured to generate the second laser beam 108. The second laser beam 108 may in certain embodiments, function as a test laser beam for measuring power levels of the system 100. In some embodiments, the second laser beam 108 may be configured to further operate as a source of illumination of a surgical site, for aiming, or the like.

In some embodiments, the second laser beam 108 generated by the second laser source 106 is a visible (380-780 nm) or IR (780-1000 nm) laser light. For example, in certain embodiments, the second laser beam 108 comprises a 640 nm laser light. However, other spectrums/ranges (e.g., 400 nm to 4 μm) are further contemplated for the second laser beam 108.

In some embodiments, the second laser source 106 may generate and transmit the second laser beam 108 having a pulse rate within a range of about 100 hertz (Hz) and 10 kilohertz (kHz). In some embodiments, the second laser source 106 may generate and transmit the second laser beam 108 having a pulse rate within a range of about 10 kilohertz (kHz) and about 5 MHz, or between about 1 kHz and about 1500 Hz. Other pulse rate ranges are contemplated as well. In some examples, the second laser source 106 produces a nanosecond, a picosecond, or a femtosecond second laser beam 108. In some embodiments, the second laser source 106 may produce a continuous coherent or semi-continuous second laser beam 108. For example, the second laser source 106 may produce a continuous wave second laser beam 108 at low power.

In some embodiments, the first laser beam 104 and the second laser beam 108 may be generated by a single laser source of the surgical laser system 101 that is configured to produce two or more types of laser beams, or laser beams having different characteristics. For example, in some embodiments, the first laser beam 104 and the second laser beam 108 may be generated by the first laser source 102. In some other embodiments, the first laser beam 104 and the second laser beam 108 may be generated by the second laser source 106.

The system 100 further includes an optical fiber 110 having a proximal end 113 configured to be removably coupled to a port 130 of the surgical laser system 101. The optical fiber 110 may be configured to proximally receive and distally propagate both of the first laser beam 104 and the second laser beam 108 generated by the first laser source 102 and the second laser source 106, respectively, which may be disposed adjacent to the proximal end 113 of the optical fiber 110. The optical fiber 110 may include any suitable type of optical fiber configured to transmit light energy along a length of the optical fiber 110. In some embodiments, the optical fiber 110 may at least in part, be made of germanium oxide based glass, sapphire, fluoride, zirconium fluoride, and/or silica. The optical fiber 110 may include a single material, a blend of materials, may have different regions of different materials, etc. However, any suitable materials or space for the efficient propagation of laser beams 104 and 108 are contemplated. The optical fiber 110 may be at least partially clad, single-clad, double clad, multi-clad, or may be unclad. In embodiments with cladding, the cladding may be concentric with one or more cores of the optical fiber 110. In some embodiments, the first laser beam 104 and/or the second laser beam 108 may be propagated through the optical fiber 110 via a cladding.

In some embodiments, the optical fiber 110 has a single core structure. In such embodiments, the first laser beam 104 and the second laser beam 108 may be propagated along the same core of the optical fiber 110. In other embodiments, the optical fiber 110 has a multi-core structure. In such embodiments, the first laser beam 104 and the second laser beam 108 may be propagated along the same core or different cores of the optical fiber 110.

Generally, the optical fiber 110 may be rigid or flexible. In some embodiments, the optical fiber 110 may be straight or tapered. In some embodiments, a diameter of the optical fiber 110 is between about 100 μm (micrometers) and about 400 μm, such as between about 100 μm and about 300 μm, such as about 100 μm and about 200 μm, such as about 200 μm and about 400 μm, such as about 200 μm and about 300 μm, such as about 300 μm and about 400 μm. In some embodiments, the optical fiber 110 may have different regions having similar or different geometries to one another. In such embodiments, the different regions may comprise one or more pieces of optical fiber butt-coupled to each other.

The optical fiber 110 may also be configured to distally receive and proximally propagate a reflected portion 120 of the second laser beam 108 that is reflected back by, and into, a distal end 115 of the optical fiber 110 during performance of power level measurements. The reflected portion 120 may be passed through the optical fiber 110 along the same core or a different core of the optical fiber 110 as at least one of the first laser beam 104 or the second laser beam 108 being propagated through the optical fiber 110 in the opposite direction.

In some embodiments, the optical fiber 110 includes an optical fiber tip 114 disposed at the distal end 115 of the optical fiber 110 opposite the first laser source 102 and/or the second laser source 106. Generally, the first laser beam 104 and the second laser beam 108 may be transmitted (i.e., emitted) distally from the optical fiber tip 114 after being propagated through the optical fiber 110. The optical fiber tip 114 may be fabricated of similar or different construction from another portion of the optical fiber 110. For example, the optical fiber tip 114 may vary from another portion of the optical fiber 110 in material, material properties, optical properties, geometry, or the like. For example, the optical fiber tip 114 may be rigid while another portion of the optical fiber 110 may include a flexible portion to allow for positioning of the optical fiber 114 relative to a test material 112 or a surgical site. In some embodiments, the optical fiber tip 114 comprises a lens or window for facilitating transmission of the first laser beam 104 and the second laser beam 108 distally from the optical fiber 110. In some embodiments, the lens or window may comprise sapphire. In some embodiments, the optical fiber tip 114 is configured to be disposed within, or be integrated with, a handpiece of a surgical tool, such as an ophthalmic surgical laser probe. In some embodiments, the material of the optical fiber tip 114 is selected to be strong enough to withstand the shock of repeatedly expanding and collapsing bubbles, and/or to not chemically interact with the test material 112. One example of such a material includes sapphire.

In some embodiments, the optical fiber 110 and/or the system 100 may further include one or more optical elements configured to direct, re-direct, filter, polarize, focus, collimate, split, or otherwise manipulate the first laser beam 104, the second laser beam 108, and/or the reflected portion 120 of the second laser beam 108. For example, in FIG. 1A, a first dichroic mirror 116 and a second dichroic mirror 118 are depicted. Generally, the dichroic mirrors 116 and 118 may facilitate either the reflection or transmission of laser beams depending on their wavelengths. In FIG. 1A, the first dichroic mirror 116 is depicted as facilitating transmission of the first laser beam 104 and re-direction (e.g., reflection) of the second laser beam 108 into the optical fiber 110, while also facilitating re-direction of the proximally-travelling reflected portion 120 of the second laser beam 108 toward the second dichroic mirror 118. The second dichroic mirror 118 then re-directs the reflected portion 120 into an optical detector 122 (or any suitable type of signal detector).

In the illustrated embodiment of FIG. 1A, a focal lens 121 is also shown. The focal lens 121 may be configured to focus at least one of the first laser beam 104 or the second laser beam 108 onto the optical fiber 110 at or through the port 130. For example, the focal lens 121 may be configured to focus at least one of the first laser beam 104 or the second laser beam 108 onto a core of the optical fiber 110.

The system 100 further includes the optical detector 122, which is configured to receive the reflected portion 120 and generate an optical detector output based on the reflected portion 120. In some embodiments, the optical fiber 110 is configured to direct the reflected portion 120 of the second laser beam 108 to the optical detector 122 indirectly (e.g., via an air, or other, gap). In other embodiments, the optical fiber 110 may direct the second laser beam 108 to the optical detector 122 through direct contact transmission. The optical detector 122 may include a sensor 124 (e.g., photodiode or other energy sensitive detector element) capable of detecting the reflected portion 120 of the second laser beam 108 incident at the optical detector 122 and further capable of generating an optical detector output.

In some embodiments, the optical detector output may be electrically amplified. In other embodiments, the optical detector output may pass through a high-pass filter to separate the transient back-reflection signal from a DC (direct current) baseline, or the high-pass filter may be used prior to or after the amplifier, or between amplifier stages.

The optical detector 122 is coupled to a controller 126 that is configured to receive and analyze the optical detector output from the optical detector 122 corresponding to the detected reflected portion 120 and determine various metrics/characteristics of the reflected portion 120. Such metrics/characteristics of the reflected portion 120 are utilized to determine power levels of laser light generated by at least the first laser source 102 at the optical fiber tip 114, as described in further detail below. Please note that although the optical detector 122 and controller 126 are shown as integrated components of the surgical laser system 101 in FIG. 1A, the optical detector 122 and controller 126 may be separate components operably coupled with the surgical laser system 101, such components of a surgical console operably coupled with the surgical laser system 101.

The system 100 may also include, or be used in combination, with a test material 112, into which the optical fiber 110 is configured to direct the first laser beam 104 and the second laser beam 108 for performing power level measurement of the first laser beam 104. In some embodiments, during use, the optical fiber 110 may be positioned to be at least partially disposed within the test material 112. In other embodiments, during use, the optical fiber 110 may be positioned to contact only a surface of the test material 112. The optical fiber 110 is configured to emit the first laser beam 104 and the second laser beam 108 from the optical fiber 110 into the test material 112. In some embodiments, the test material 112 may include a liquid such as water, saline, balanced salt solution (BSS), or the like. In some embodiments, the test material 112 may include a viscoelastic material. Other examples may include liquid, semi-liquid, and/or semi-solid materials that form a transient bubble upon delivery of laser energy to the test material. In some embodiments, the test material 112 is a disposable or single-use material. In some embodiments, the test material 112 may be a reusable or multi-use material.

To measure the power level of laser light generated by the first laser source 102, the optical fiber tip 114 is placed into or adjacent the test material 112, and the first laser source 102 is activated to generate the first laser beam 104. The first laser beam 104 is received at the proximal end of optical fiber 110 and is propagated distally through the optical fiber 110 for transmission from the optical fiber tip 114 into the test material 112. Upon receipt of the first laser beam 104 by the test material 112, the thermal energy of the first laser beam 104 causes the test material 112 to vaporize, or otherwise change in state or form, resulting in a bubble 113 or cavity within the test material 112 and adjacent to the optical fiber tip 114. Continued transmission of the first laser beam 104 into the test material 112 causes the resultant bubble 113 to expand before collapsing. In certain embodiments, each subsequent emission/firing of the first laser beam 104 from the first laser source 102 may generate a corresponding bubble. Generally, differing levels of power of the first laser beam 104 will cause different bubble characteristics or bubble formation profiles for the bubble 113.

Simultaneously with the first laser beam 104, the second laser beam 108 is generated and propagated distally through the optical fiber 110 and out of the optical fiber tip 114. The second laser beam 108 is thus conveyed to an interface between the test material 112 and the optical fiber tip 114 of the optical fiber 110. As the bubble 113 forms and expands due to the thermal energy of first laser beam 104, the second laser beam 108 will be subjected to a change in index of refraction at the interface as the interface shifts from, for example, a solid-liquid (e.g., sapphire-BSS) interface to a solid-vapor (e.g., sapphire-vaporized BSS) interface. For example, the index of refraction before formation of the bubble 113 may be approximately equal to 1.33 between the optical fiber 110 and the test material 112. Once the bubble 113 is formed, the index of refraction may change to approximately 1.0 at the interface of the optical fiber 110 and the vapor within the bubble 113.

The change in the index of refraction at the distal end of the optical fiber 110 results in a change of the Fresnel coefficients of the distal end of the optical fiber 110 and, thus, the optical behavior of the second laser beam 108 at the end of the optical fiber 110, whereby an increased amount of second laser beam 108 is back-reflected through the optical fiber 110. For example, with the bubble 113 present, a larger portion of the second laser beam 108 may be transiently reflected by the optical fiber tip 114 proximally through the optical fiber 110 while a smaller portion of the second laser beam 108 may pass into the test medium. A portion of the transmitted part of the laser beam may be further reflected from the inner surface of the bubble 113 back into the fiber.

The change in optical behavior of the second laser beam 108 is detected by the sensor 124 of optical detector 122, which continuously or non-continuously monitors/detects for the reflected portion 120 of the second laser beam 108 and sends an optical detector output to the controller 126. The controller 126 coupled therewith may then analyze the detected signal to determine metrics/characteristics of the reflected portion 120, which can be correlated with pre-defined or predetermined bubble characteristics or bubble formation profiles and thus, a power of the first laser beam 104.

Figure 1B:
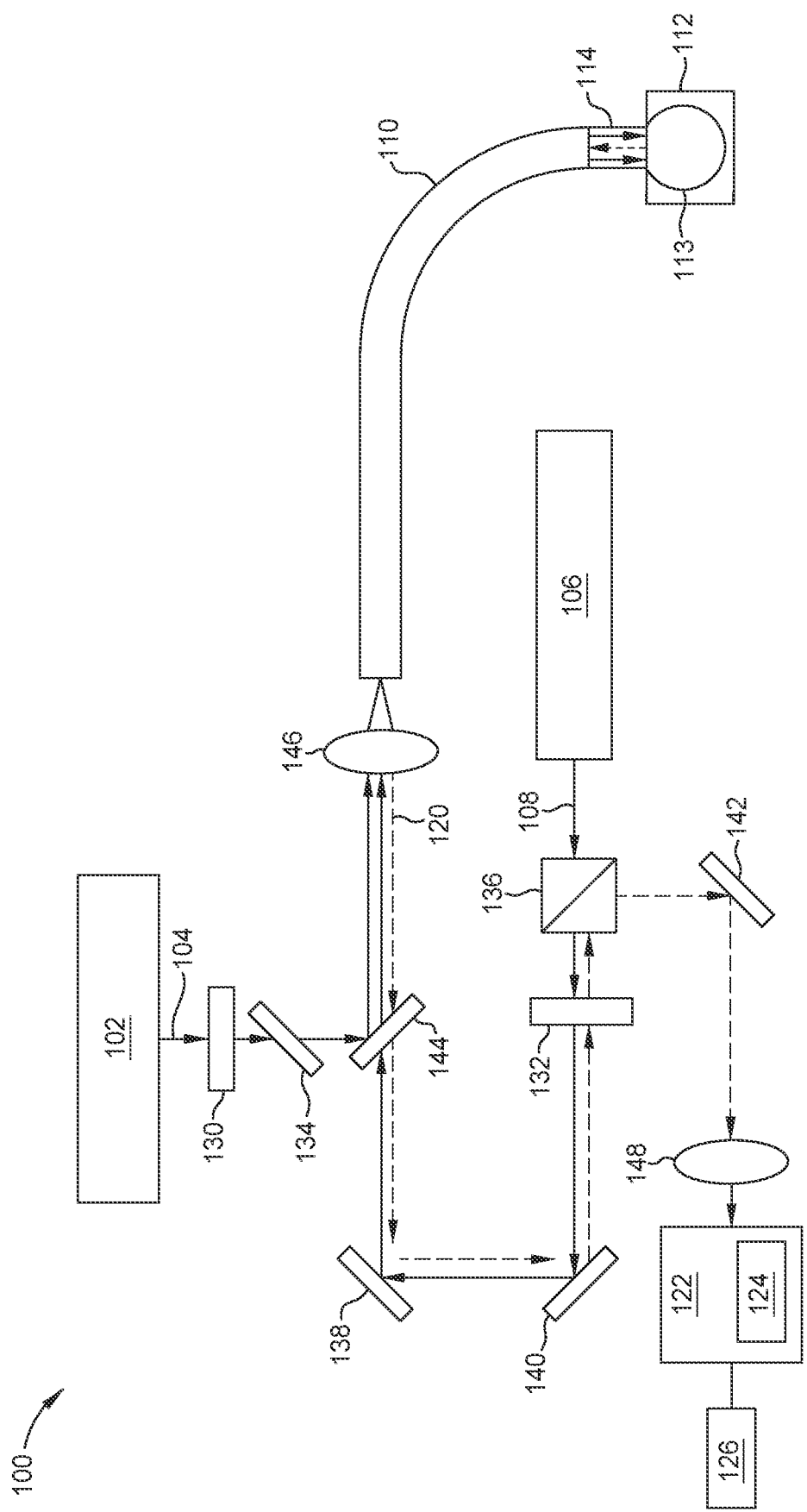
FIG. 1B illustrates another arrangement of the example system of FIG. 1A, in accordance with certain embodiments of the present disclosure.

FIG. 1B illustrates another embodiment of the system 100 of FIG. 1A. As mentioned above, additional optical components and/or relays are also contemplated for use with the system 100. The illustrated embodiment of FIG. 1B includes additional optical components in the form of wave plates (e.g., half wave plate 130, quarter wave plate 132), polarizing elements (polarizer 134, polarizing cube 136), reflectors (e.g., reflector 138, 140, 142), dichroic elements (e.g., dichroic 144), lenses (e.g., focusing lenses 146, 148, collimators, etc.), and the like. In some examples, the optical components may be used to facilitate power modification, laser light isolation, transmission of identified wavelengths, etc. One or more components may include coatings (e.g., anti-reflective coating), materials, gratings, films, etc. to separate wavelengths, isolate the laser from the back-reflected beams or the like. In some embodiments, physical structures may be used to transmit light. In other embodiments, light may be transmitted through free space. In some embodiments, light may be transmitted via a combination of physical structures and free space.

Note that other surgical laser systems are also contemplated for use with the present systems and methods for real-time laser power measurement. Such surgical laser systems include those described in U.S. patent application Ser. No. 17/662,148 (U.S. Patent Publication No. 20220354692) entitled "Surgical Laser System with Illumination", filed May 5, 2022, which is herein incorporated by reference in its entirety.

Figure 2:
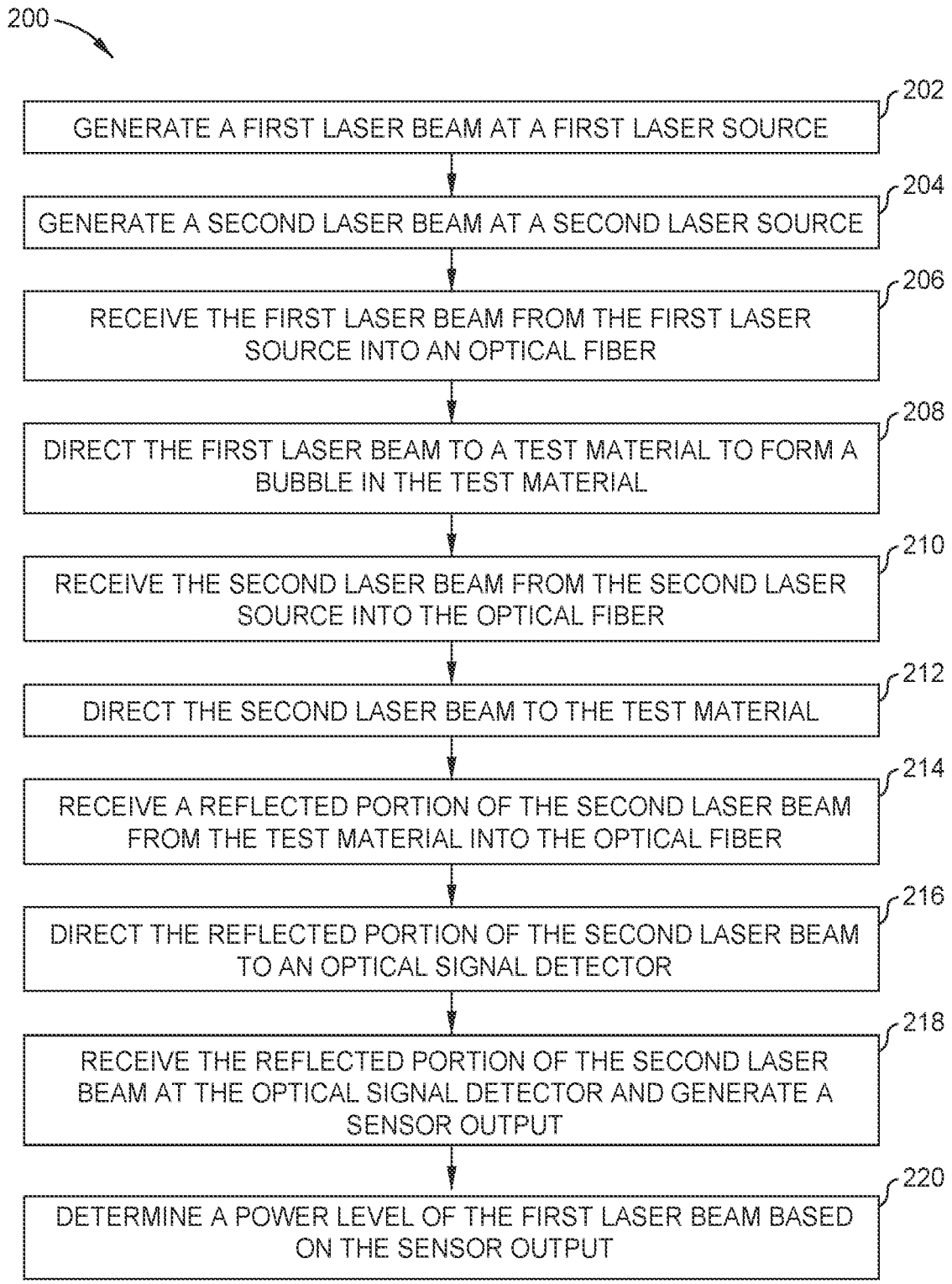
FIG. 2 illustrates an example method of performing laser power measurement, in accordance with certain embodiments of the present disclosure.

FIG. 2 illustrates a method 200 of performing laser power measurement with the system 100, according to certain embodiments described herein. FIGS. 3A-3F illustrate one or more operations of the method 200. Accordingly, FIG. 2 and FIGS. 3A-3F are herein described together, where appropriate, for clarity.

Turning to FIG. 2, at block 202 of the method 200, the first laser beam 104 is generated by the first laser source 102.

At block 204, the second laser beam 108 is generated by the first laser source 102 or a second laser source 106. In some embodiments, the second laser beam 108 is generated simultaneously with the first laser beam 104. In some embodiments, the second laser beam 108 is generated sequentially with the first laser beam 104. For example, the second laser beam 108 may be generated prior to generating the first laser beam 104, or vice versa.

At block 206 of the method 200, the first laser beam 104 is received from the first laser source 102 into the optical fiber 110, which may be an optical fiber having one or more cores and/or claddings for simultaneously or sequentially propagating the first laser beam 104 and second laser beam 108. In other embodiments, the optical fiber may be an unclad fiber, such as an unclad sapphire rod or fiber.

At block 208, the optical fiber 110 directs (e.g., propagates) the first laser beam 104 to the test material 112 to form a bubble 113 in the test material 112. As described above, the test material 112 may include a liquid such as water, saline, balanced salt solution (BSS), or the like. The formation of the bubble 113, for a short period of time, changes the refractive index of the test material 112 and therefore, the reflection coefficient of the interface between the optical fiber tip 114 of the optical fiber 110 and the test material 112.

FIGS. 3A-3F illustrate the formation of the bubble 113 during block 208. In particular, in FIG. 3A, the first laser beam 104 is transmitted from the optical fiber tip 114 into the test material 112. As the energy from the first laser beam 104 interacts with the test material 112, a first stage bubble 113A begins to form. Formation of the first stage bubble 113A is marked by a separation of the test material 112 from the optical fiber tip 114.

Figure 3A:
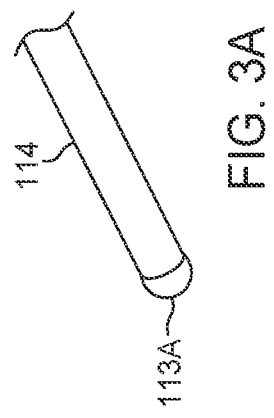
FIGS. 3A-3F illustrate a bubble progression during performance of laser power measurement, in accordance with certain embodiments of the present disclosure.
Figure 3B:

In FIG. 3B, a second stage bubble 113B continues to expand, thereby increasing in volume relative to the first stage bubble 113A. The expansion of the second stage bubble 113B is due to expanding vapor within the bubble 113 as caused by the energy of the first laser beam 104.

Figure 3C:
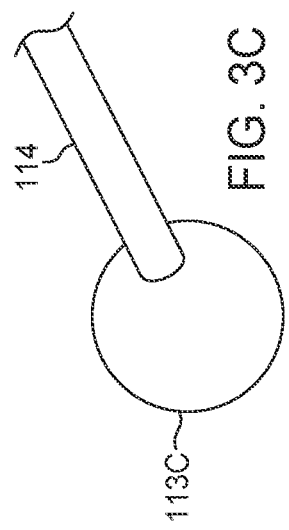

In FIG. 3C, a third stage bubble 113C reaches a peak volume as vapor pressure and dynamic movement of the bubble 113 reach an equilibrium with the pressure of the test material 112.

Figure 3D:
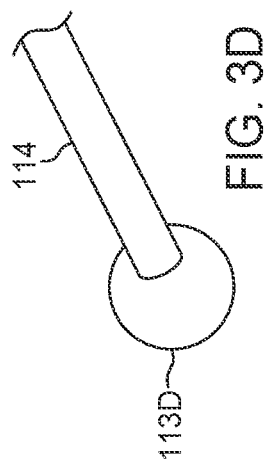

In FIG. 3D, a fourth stage bubble 113D begins to collapse, thus reducing in volume and allowing the test material 112 to draw closer to the optical fiber tip 114 as the energy from the bubble 113 disperses.

Figure 3E:
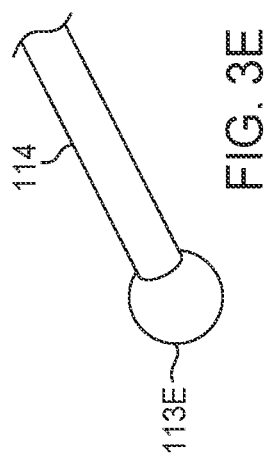

In FIG. 3E, a fifth stage bubble 113E continues to reduce in volume and the fifth stage bubble 113E begins to separate from the optical fiber tip 114 during the collapse.

Figure 3F:
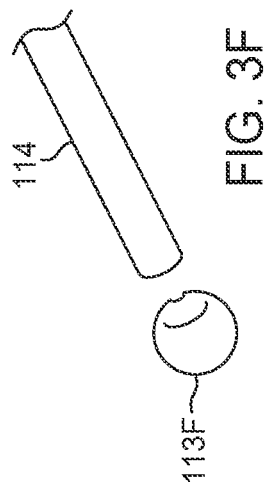

In FIG. 3F, a sixth stage bubble 113F is fully separated from the optical fiber tip 114 with test material 112 fully interstitial between the sixth stage bubble 113F and the optical fiber tip 114.

Turning back now to FIG. 2, at block 210 of the method 200, the second laser beam 108 is propagated into the optical fiber 110 by the second laser source 106.

At block 212, the second laser beam 108 is directed through the optical fiber 110 and toward the test material 112, as previously described in FIG. 1A. In some embodiments, the second laser beam 108 may be carried in a same core of the optical fiber 110 as the first laser beam 104, or in a different core in examples where the optical fiber 110 comprises a multi-core arrangement. In some embodiments, the optical fiber 110 may be clad, and the first laser beam 104 and/or second laser beam 108 are propagated in a cladding.

At block 214 of the method 200, a portion (e.g., reflected portion 120) of the second laser beam 108 is back-reflected from the interface of the optical fiber tip 114 and the test material 112 and is received by the optical fiber 110. As the bubble 113 is formed, the bubble 113 changes the reflection coefficient of the interface between the optical fiber tip 114 and the test material 112, thereby creating a transient modulation of the back-reflected portion 120. In certain embodiments, some of the second laser beam 108 may be reflected from within the bubble 113 to return into the optical fiber 110.

At block 216, the reflected portion 120 of the second laser beam 108 is propagated back through the optical fiber 110 and is directed to the optical detector 122 (such as by using one or more optics or relays).

At block 218, the method 200 includes receiving the reflected portion 120 of the second laser beam 108 at the sensor 124 and generating, by the sensor 124 and/or optical detector 122, an optical detector output (e.g., a signal) based on the received reflected portion 120. In some embodiments, the optical detector output is a signal profile (e.g., a measured reflection time signal as described below in FIGS. 4A and 4B.)

In some embodiments, the optical detector output may be electrically amplified. In other embodiments, the electrical detector output may pass through a high-pass filter to separate the transient back-reflection signal from the DC baseline, or the high-pass filter may be used in front or after the amplifier, or between amplifier stages.

At block 220, the method 200 includes determining a power level of the first laser beam 104, in real time, based on the optical detector output. For example, in some embodiments, various features and/or characteristics of the signal profile of the reflected portion 120 may be correlated to features and/or characteristics of predetermined or defined signal profiles corresponding to one or more power levels of the first laser beam 104. Such features and/or characteristics may include a number of peaks, a duration of peaks, a rise time, a fall time, etc. In some embodiments, a signal profile of the reflected portion 120 corresponds to the lifetime of a single bubble 113 formed as a result of firing the first laser beam 104 into the test material 112. Accordingly, in some embodiments, the power level of the first laser beam 104 may be determined based on a time duration component of the reflected portion 120 as determined from the optical detector output.

Figure 4A:
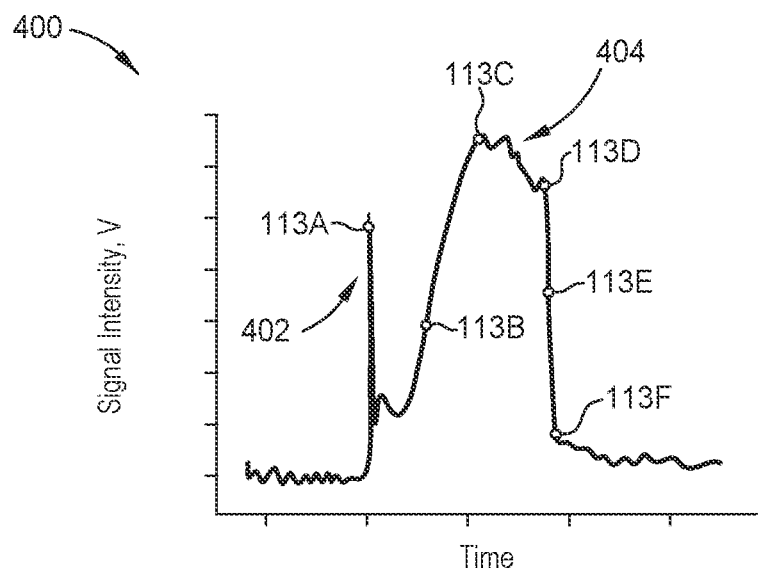
FIGS. 4A-4B illustrate graphs of reflected portions of laser light, in accordance with certain embodiments of the present disclosure.
Figure 4B:
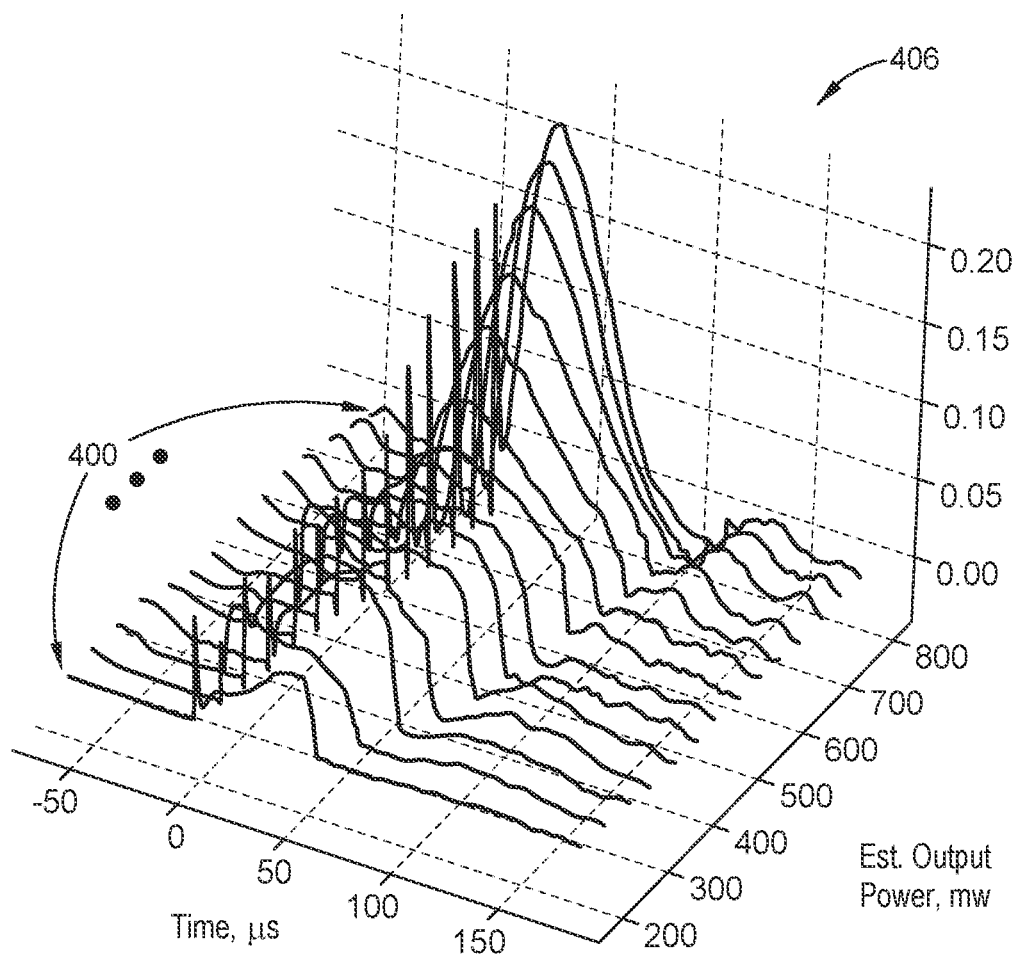

Turning now to FIGS. 4A and 4B, exemplary signal profiles for the reflected portion 120 of the second laser beam 108 during the formation and collapse of the bubble 113 in the test material 112, as detected by the optical detector 122, are illustrated according to certain embodiments described herein. While particular shapes of the signal profiles are shown, other shapes may also result and also provide power measurement capability.

In the example of FIG. 4A, a single signal profile 400 is shown, corresponding to the formation and collapse of a single bubble 113 as caused by the first laser beam 104 at a certain power level. The signal profile 400 comprises a plot of signal voltage values over time for the reflected portion 120 of the second laser beam 108. In the illustrated example, the signal profile 400 for the reflected portion 120 includes a first peak 402 (and decline) corresponding to the first stage bubble 113A of FIG. 3A. The first peak 402 may be indicative of a slightly higher reflectivity as an interface between the first stage bubble 113A and the test material 112 may still be proximate to the optical fiber tip 114, but is beginning to separate therefrom, thus causing the subsequent drop in reflection following the first peak 402.

After the first peak 402, the signal profile 400 steadily rises, which corresponds to the formation of the second stage bubble 113B as vapor within the bubble 113 expands and a greater portion of the second laser beam 108 is reflected by the optical fiber tip 114 at formation of the second stage bubble 113B. In the illustrated example, the signal profile 400 includes a second peak 404 corresponding to the formation of the third stage bubble 113C. The third stage bubble 113C may represent a maximum volume of the bubble 113 at which vapor pressure within the bubble 113 is at equilibrium with the resistance of the test material 112. Because the vapor within the bubble 113 may be at the lowest density during the third stage bubble 113C, the signal profile 400 may be highest at this second peak 404 based on the index of refraction at the optical fiber tip 114. As the bubble 113 progresses to the fourth stage bubble 113D, the signal profile 400 may begin to decrease with a greater drop off occurring as the bubble 113 collapses more rapidly through the fifth stage bubble 113E. In the illustrate embodiment, the separation of the bubble 113 relative to the optical fiber tip 114 in the sixth stage bubble 113F may return a steady-state value at the optical detector 122 indicative of an end of lifecycle of the bubble 113.

In the example of FIG. 4B, a graph 406 of fourteen different signal profiles 400 is shown, wherein each of the fourteen illustrated signal profiles 400 comprises a plot of signal voltage values over time. Each different signal profile 400 may correspond to a different power level output by the first laser source 102 when generating the first laser beam 104. In the illustrated example, it can be seen that an increase in output power (mW) (milliwatt) for the first laser source 102 resulted in a longer time trace for the corresponding signal profile 400. As further shown, increasing the output power also yielded signal profiles 400 with higher intensity peaks (e.g., corresponding to higher levels of collection of the light back reflected from the curved surface of the bubble) of the second laser beam 108.

Figure 5:
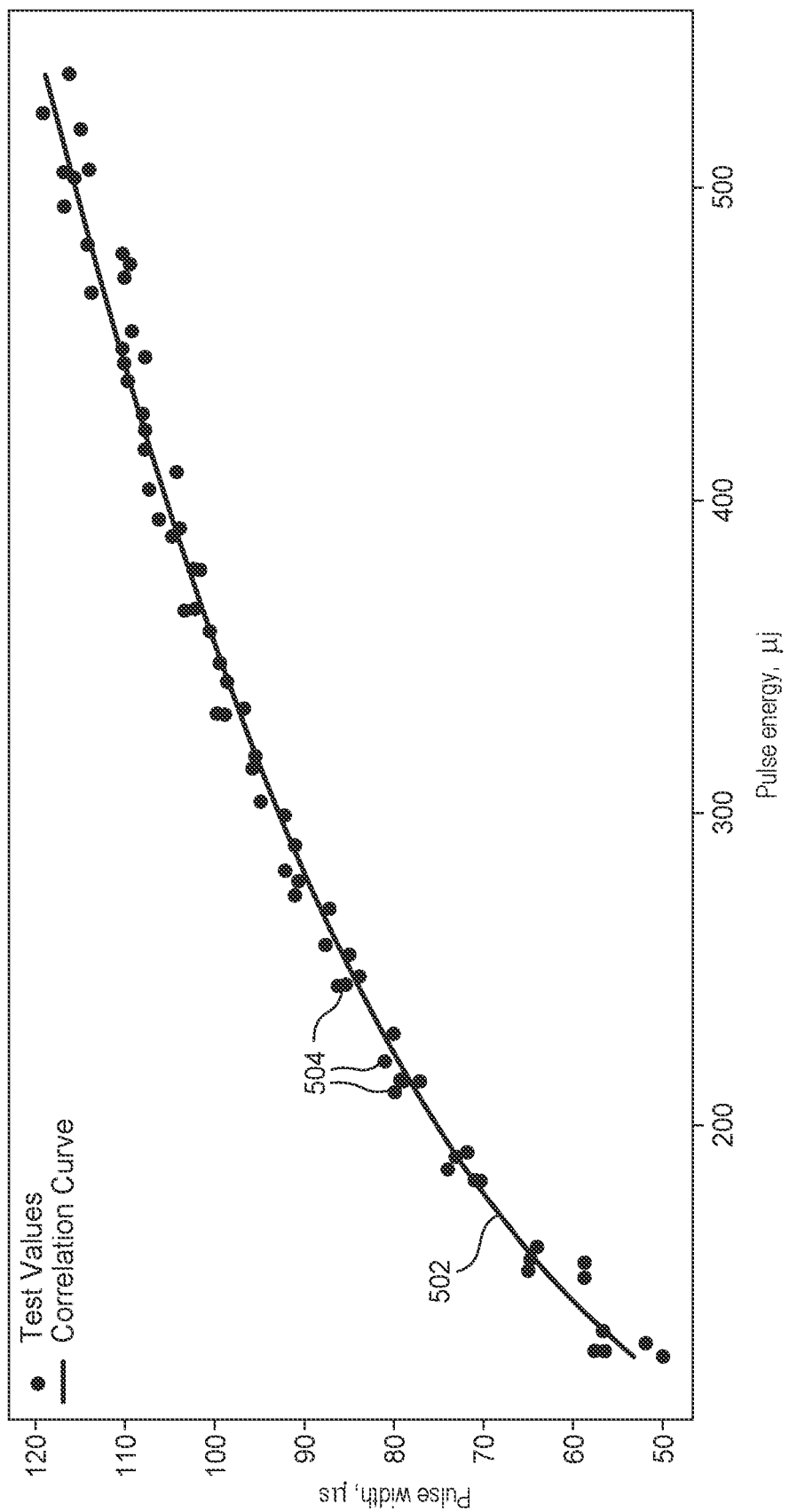
FIG. 5 illustrates a correlation curve of a back-reflection pulse width of a second laser to a laser power of a first laser, in accordance with certain embodiments of the present disclosure.

Once desired characteristics/features of a signal profile 400 are determined, such as a pulse width or duration of the signal profile 400, such characteristics/features may be mapped to one or more predetermined correlation curves to determine the power level of the first laser beam 104. In some embodiments, the correlation curve may be at least partially dependent on a phase transition enthalpy of the test material 112, a diameter of the optical fiber 110, a pulse wavelength and/or duration of the first laser source 102, etc. An example of a correlation curve 502 is shown in FIG. 5. In the illustrated example, measured characteristics of signal profiles 400 are shown as test value points 504 disposed along, or substantially along, a correlation curve 502 that has been previously based on standardized samples. Using a correlation curve similar to the correlation curve 502, a user may be able to determine the pulse energy of the first laser beam 104 and power of the first laser source 102 based on measured characteristics of the back-reflection signal profile (s) 400 of the second laser beam 108.

In some embodiments, the correlation curve 502 may be tuned to correspond to a particular test material 112 or group of test materials. As an example, if the test material 112 is a BSS, a corresponding correlation curve may be selected for determining the power level of the first laser beam 104. Similarly, a particular correlation curve may be established for at least one of a first laser source 102, an optical fiber 110, an optical fiber tip 114, etc.

In some embodiments, the lifetime of the laser generated bubble 113 in a liquid test material 112 can be described by the equation $T=C(E-E_{threshold})^{1/3}$, where T is the lifetime of the bubble (in μsec) (microsecond), E is the energy of the laser pulse generating the bubble (in μJ) (micro Joules), and C and $E_{threshold}$ are constants that depend on the properties of the liquid test material 112, laser source 102, and the light delivery mechanism (e.g., optical fiber 110 and associated optics). For example, for a test material 113 consisting of water, the constant C may be equal to or substantially equal to 13.3.

In some embodiments, the correlation curve 502 for a particular surgical laser system 101 or surgical console, which may include one or more laser sources (e.g., laser source 102 and/or 108), an optical fiber delivery system (e.g., optical fiber 110 and other optical elements of the surgical laser system or console), and a test material 112, can be measured in non-sterile environment prior to performance of a surgical procedure. For example, the power output of the first laser source 102 at the optical fiber tip 114 may be measured using a power meter and the dependence of the transient back-reflection pulse widths vs. the first laser pulse energy recorded for future use as a correlation curve.

The correlation curve 502 can also be established in a sterile environment by measuring the transient signal pulse width of the reflection portion 120 at several pulse energy levels (for example, at 40%, 50%, 60%, 70%, 80%, 90%, 100% of maximum pulse energy) of the bubble-generating first laser source 102, fitting the pulse width vs energy data point to a $T=C(E-E_{threshold})^{1/3}$ function as described above, and obtaining the C and $E_{threshold}$ values.

Figure 6:
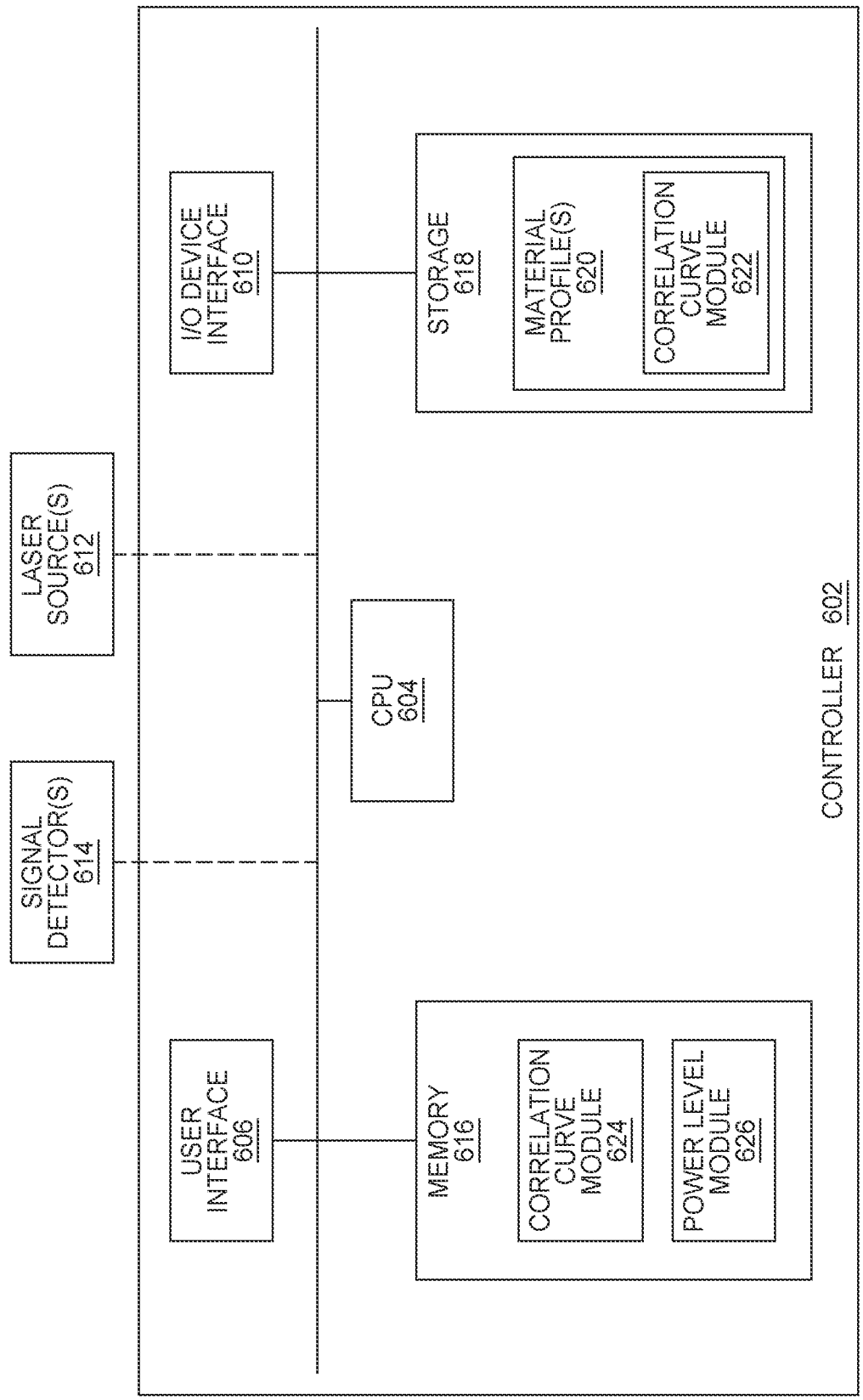
FIG. 6 illustrates a schematic diagram of a surgical console and components thereof, in accordance with certain embodiments of the present disclosure.

FIG. 6 illustrates a schematic diagram of a controller 602, according to embodiments disclosed herein. The controller 602 is generally representative of the controller 126 described above and may be integrated with or operably coupled with a surgical console. In some embodiments, the controller 602 includes, without limitation, a user interface 606, an interconnect 608, and at least one I/O (Input/Output) device interface 610, which may allow for the connection of various I/O devices (e.g., keyboards, displays, mouse devices, pen input, etc.) to the controller 602. The controller 602 may be in wired or wireless communication with one or more laser sources 612 (e.g., the first laser source 102 and/or the second laser source 106 of FIG. 1A) and one or more optical detectors 614 (e.g., optical detector 122 of FIG. 1A having sensor 124) via the interconnect 608. In some embodiments, in addition to or separately from the controller 126, the one or more laser sources 612 and/or the one or more optical detectors 614 may be integrated with or operably coupled with a surgical console.

The controller 602 further includes a CPU 604 (Central Processing Unit), a memory 616, and a storage 618. The CPU 604 is configured to retrieve and execute programming instructions stored in the memory 616. Similarly, the CPU 604 may retrieve and store application data residing in the memory 616. The interconnect 608 transmits programming instructions and application data, among the CPU 604, I/O device interface 610, user interface 606, memory 616, storage 618, laser source(s) 612, optical detector(s) 614, etc. The CPU 604 may include a single CPU, multiple CPUs, a single CPU having multiple processing cores, and the like. The memory 616 may be random access memory, and the storage 618 may be a disk drive. Moreover, the memory 616 and/or storage 618 may be any type of a readily available memory, such as random access memory (RAM), read only memory (ROM), floppy disk, hard disk, solid state, flash memory, magnetic memory, or any other form of digital storage, local or remote. In certain embodiments, the memory 616 and/or storage 618 include instructions, which when executed by the CPU 604, can affect determinations/measurements of a power levels of the laser source(s) 612 based on data received from the optical detectors 614. In certain embodiments, the CPU 604, memory 616, and storage 618 may be the main processor and memory of controller 602.

In the embodiment of FIG. 6, the CPU 604 of the controller 602 may include an integrated circuit capable of performing logic functions. In this manner, the CPU 604 is in the form of a standard integrated circuit package with power, input, and output pins. In other embodiments, the CPU 604 is a microprocessor. In other cases, the CPU 604 is not a programmable microprocessor, but instead is a special purpose controller.

In the embodiment of FIG. 6, the controller 602 receives signals from one or more optical detectors 614. These signals, for example, may include optical detector output corresponding to reflected light received at sensor(s) of the one or more optical detectors 614.

As shown, the storage 618 includes material profiles 620 representing various test material types. For example, the material profiles 620 may include information corresponding to different test materials (e.g., saline, water, BSS, etc.) that may be utilized for generating correlation curves or for determining power levels of the laser source(s) 612 based on generated correlation curves. In some embodiments, the material profiles 620 may include bubble formation characteristics of the corresponding test material. In some embodiments, each of the material profiles 620 stored in the storage 618 may include one of more generated correlation curves 622 corresponding to the material of the material profile 620. The correlation curves 622 may be retrieved by a power level module 624 of the memory 616 to determine the power of the laser source(s) 612 based on optical detector output received from the one or more optical detectors 614.

As shown, the memory 616 includes a correlation curve generator 624 and the power level module 626. When executed, the correlation curve generator 624 utilizes the signals received from the one or more optical detectors 614 to generate correlation curves for a given test material, which may be stored in a corresponding material profile 620. Meanwhile, the power level module 626, when executed, utilizes the signals received from the one or more optical detectors 614, in combination with one or more correlation curves 622 stored in storage 618, to determine the power of the laser source(s) 612. In certain embodiments, after a power of the laser source(s) 612 is determined by the power level module 626, the controller 602 may output the determined power to a user graphical display or other I/O device in communication with the controller 602 via the I/O device interface 610.

In summary, embodiments of the present disclosure include systems and methods for laser power measurement, and more particularly, systems and methods for laser power measurement in a sterile operating environment. In certain embodiments described herein, power measurement is performed utilizing two laser sources: 1) a first laser source configured to generate a first laser beam (treatment laser); and 2) a second laser source configured to generate a second laser beam (test laser). The first laser beam generates a bubble in a test material (e.g., water, saline, balanced salt solution, gel, etc.) and the second laser beam is reflected back with the reflected portion of the second laser beam being measured to determine a lifetime of the bubble and correlate the lifetime measurement with a power value based on a correlation curve. Laser power measurement using the back reflection of the second laser beam allows for testing in a sterile environment and embodiments may allow for testing during a surgical operation. Testing of the laser power level can identify equipment issues including improper assembly, faulty components, misalignment due to movement or use prior to or during a surgical operation, and the like. Thus, the methods and systems described herein enable not only improved safety of testing in a sterile environment, but also improve the ability to test power levels of a laser prior to and during an operation without introducing contaminants.

The above-disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system for laser power and pulse energy measurement, the system comprising:
    a first laser source configured to generate a first laser beam in a pulsed form;
    a second laser source configured to generate a second laser beam;
    an optical fiber configured to:
        receive the first laser beam from the first laser source;
        direct the first laser beam to a test material to form a bubble in the test material;
        receive the second laser beam from the second laser source;
        direct the second laser beam to the test material;
        receive a reflected portion of the second laser beam from an interface of the test material and the optical fiber; and
        direct the reflected portion of the second laser beam to an optical detector;
    the optical detector configured to:
        receive the reflected portion of the second laser beam from the optical fiber; and
        generate an optical detector output based on the reflected portion of the second laser beam, wherein a waveform shape of the optical detector output is dependent on a pulse energy of the first laser beam; and
    a controller configured to determine a power and the pulse energy of the first laser beam based on the optical detector output.

2. The system of claim 1, wherein the optical detector comprises a photodiode optical sensor configured to generate the optical detector output.

3. The system of claim 1, wherein the optical detector is further configured to measure a lifetime of the bubble by determining a change in reflectance of the second laser beam as caused by a change of an index of refraction at an interface of the optical fiber.

4. The system of claim 1, wherein at least a portion of the optical fiber comprises sapphire.

5. The system of claim 1, further comprising a dichroic element positioned to direct the second laser beam from the second laser source to the optical fiber.

6. The system of claim 1, wherein the first laser beam comprises an infrared laser light.

7. The system of claim 1, wherein the optical detector output is filtered by a high-pass filter prior to the controller determining the power and the pulse energy of the first laser beam.

8. A method comprising:
    generating, by a first laser source, a first laser beam in a pulsed form;
    generating, by a second laser source, a second laser beam;
    receiving, by an optical fiber, the first laser beam from the first laser source;
    directing, by the optical fiber, the first laser beam to a test material to form a bubble in the test material;
    receiving, at the optical fiber, the second laser beam from the second laser source;
    directing, by the optical fiber, the second laser beam to the test material;
    receiving, at the optical fiber, a reflected portion of the second laser beam from an interface of the test material and the optical fiber;
    directing, by the optical fiber, the reflected portion of the second laser beam to an optical detector;

receiving, at the optical detector, the reflected portion of the second laser beam from the optical fiber; and determining, by a controller in communication with the optical detector, a power and a pulse energy of the first laser beam based on a change in the reflected portion of the second laser beam received at the optical detector.

9. The method of claim 8, wherein the optical detector comprises a photodiode optical sensor.

10. The method of claim 8, wherein the optical detector and controller are further configured to measure a lifetime of the bubble by determining a change in reflectance of the second laser beam due to a change of an index of refraction at the interface of the optical fiber and the test material.

11. The method of claim 8, wherein at least a portion of the optical fiber comprises sapphire.

12. The method of claim 8, wherein the first laser beam comprises an infrared laser.

13. The method of claim 8, wherein the optical detector output is filtered by a high-pass filter prior to determining the power and pulse energy of the first laser beam.

14. The method of claim 8, wherein the determining the power and the pulse energy of the first laser beam is further based on a correlation curve that correlates pulse energy levels of the first laser beam with pulse widths of the reflected portion of the second laser.

15. The method of claim 14, wherein the correlation curve is determined by measuring the pulse widths of the reflected portion of the second laser at several fractional pulse energy levels of the first laser beam, and by fitting the measurements to an equation $T=C (E-Ethreshold)^{1/3}$.

* * * * *